United States Patent
Meyer et al.

(10) Patent No.: US 11,190,337 B2
(45) Date of Patent: Nov. 30, 2021

(54) EXECUTION UNIT FOR CALCULATIONS WITH MASKED DATA

(71) Applicant: INFINEON TECHNOLOGIES AG, Neubiberg (DE)

(72) Inventors: Bernd Meyer, Munich (DE); Thomas Poeppelmann, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 149 days.

(21) Appl. No.: 16/431,775

(22) Filed: Jun. 5, 2019

(65) Prior Publication Data

US 2019/0379529 A1    Dec. 12, 2019

(30) Foreign Application Priority Data

Jun. 6, 2018    (DE) ...................... 10 2018 113 475.4

(51) Int. Cl.
| | |
|---|---|
| *G06F 21/00* | (2013.01) |
| *H04L 9/00* | (2006.01) |
| *G06F 7/575* | (2006.01) |
| *G06F 7/72* | (2006.01) |
| *G06F 7/523* | (2006.01) |

(52) U.S. Cl.
CPC .............. *H04L 9/008* (2013.01); *G06F 7/523* (2013.01); *G06F 7/575* (2013.01); *G06F 7/724* (2013.01); *H04L 2209/04* (2013.01)

(58) Field of Classification Search
CPC ..... H04L 9/008; H04L 2209/04; G06F 7/523; G06F 7/575; G06F 7/724
See application file for complete search history.

(56) References Cited

U.S. PATENT DOCUMENTS

| | | | | | |
|---|---|---|---|---|---|
| 3,609,704 | A | * | 9/1971 | Schurter ............. | G06F 11/0751 714/54 |
| 3,643,032 | A | * | 2/1972 | Ulrich ................. | H04Q 3/5455 379/269 |
| 3,818,442 | A | * | 6/1974 | Solomon ................ | G06F 7/724 714/781 |
| 4,566,105 | A | * | 1/1986 | Oisel ..................... | H03M 13/27 714/756 |
| 6,025,821 | A | * | 2/2000 | Mart ....................... | G09G 3/22 345/204 |

(Continued)

FOREIGN PATENT DOCUMENTS

DE    102011012328 A1    8/2012

OTHER PUBLICATIONS

Bringer, J. et al., "Orthogonal Direct Sum Masking", dated 2014, 19 pages, published in IFIP International Workshop on Information Security Theory and Practice, Springer, Berlin.

(Continued)

*Primary Examiner* — Ghodrat Jamshidi
(74) *Attorney, Agent, or Firm* — Viering, Jentschura & PartnerMBB

(57) ABSTRACT

According to one embodiment, an execution unit is described, which includes a mask generation circuit configured to generate a mask by multiplying a mask generation vector by blocks of codewords of a plurality of cyclic codes, a masking circuit configured to mask data to be processed by means of the mask, and an arithmetic logic unit configured to process the masked data by means of additions and rotations.

14 Claims, 6 Drawing Sheets

(56) References Cited

U.S. PATENT DOCUMENTS

| | | | |
|---|---|---|---|
| 6,367,067 B1* | 4/2002 | Odani | G06F 8/445 |
| | | | 717/154 |
| 6,441,810 B1* | 8/2002 | Skoog | G06F 3/0383 |
| | | | 345/179 |
| 9,760,737 B2 | 7/2017 | Cammarota et al. | |
| 2008/0126843 A1* | 5/2008 | Nygren | G06F 11/1004 |
| | | | 714/6.2 |
| 2009/0212111 A1* | 8/2009 | Krichi | G06K 7/1417 |
| | | | 235/462.11 |
| 2010/0023572 A1* | 1/2010 | Dupaquis | G06F 7/726 |
| | | | 708/492 |
| 2011/0185151 A1* | 7/2011 | Whitaker | G06F 15/8015 |
| | | | 712/22 |
| 2013/0215682 A1* | 8/2013 | Yang | G11C 16/3431 |
| | | | 365/185.29 |
| 2014/0241522 A1 | 8/2014 | Breuer | |
| 2015/0006858 A1* | 1/2015 | Toll | G06F 9/30189 |
| | | | 712/208 |
| 2015/0169904 A1* | 6/2015 | Leiserson | G06F 21/71 |
| | | | 713/189 |
| 2015/0317281 A1* | 11/2015 | Sharifi | G06F 17/15 |
| | | | 708/422 |
| 2016/0275308 A1* | 9/2016 | Hubaux | H04L 9/065 |
| 2017/0228547 A1* | 8/2017 | Smith | H04L 63/0428 |
| 2017/0244553 A1 | 8/2017 | Savry et al. | |
| 2018/0165479 A1* | 6/2018 | Chen | G06F 12/1408 |
| 2020/0076594 A1* | 3/2020 | Audley | H04L 9/085 |
| 2021/0028934 A1* | 1/2021 | Hamburg | H04L 9/0869 |

OTHER PUBLICATIONS

Moradi, A., "Masking as a Side-Channel Countermeasure in Hardware", dated Sep. 6, 2016, 46 pages, ISCISC 2016 Tutorial, Tehran.

Golic, Jovan DJ., "Techniques for random masking in hardware", published on Feb. 12, 2007, 27 pages, vol. 54, published in IEEE Transactions on Circuits and Systems I: Regular Papers.

German Office Action for corresponding german patent application 10 2018 113 475.4, dated May 28, 2019, 11 pages (for informational purpose only).

* cited by examiner

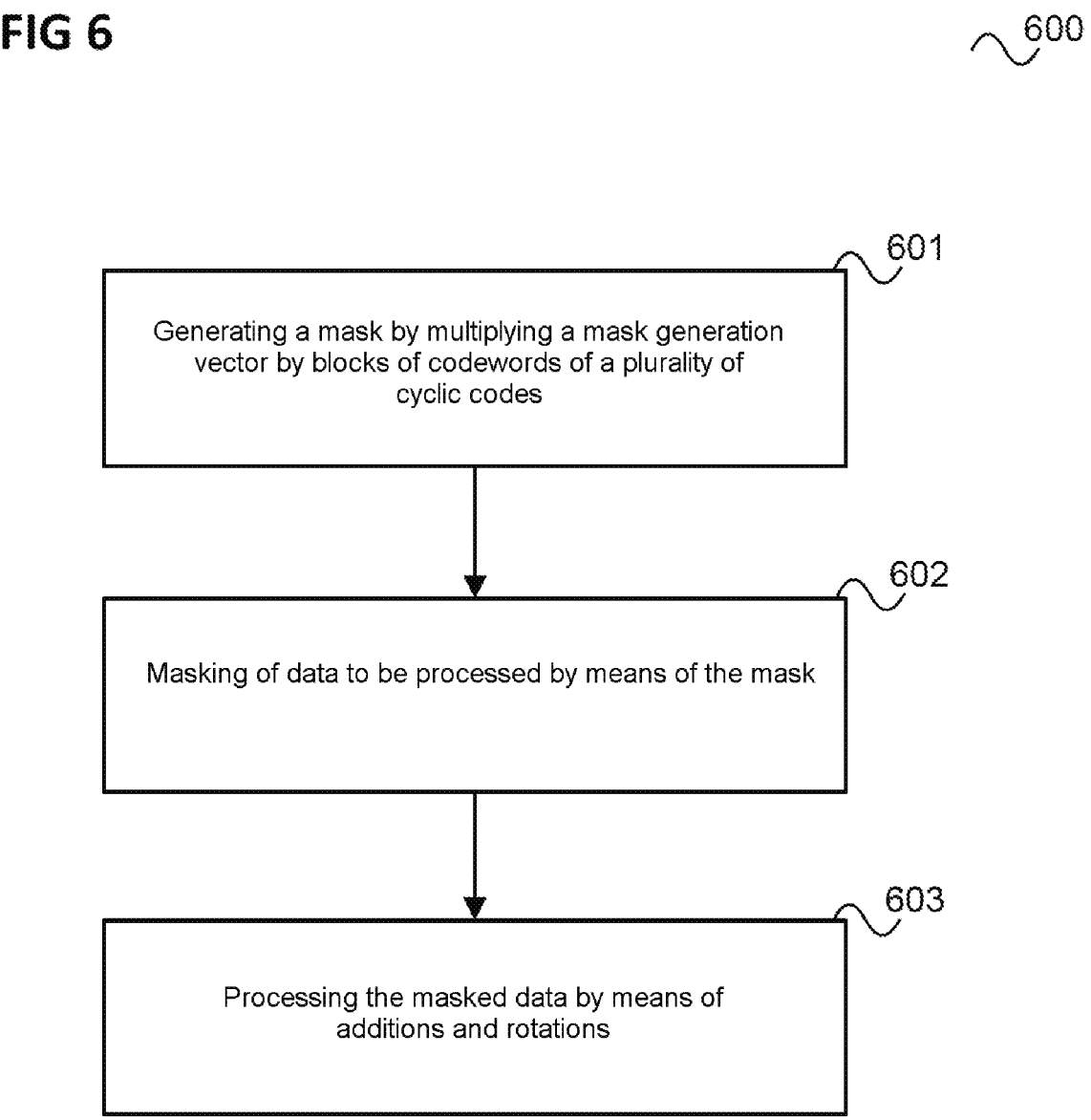

EXECUTION UNIT FOR CALCULATIONS WITH MASKED DATA

CROSS-REFERENCE TO RELATED APPLICATION

This application claims priority to German Patent Application Serial No. DE 10 2018 113 475.4, which was filed Jun. 6, 2018, and is incorporated herein by reference in its entirety.

TECHNICAL FIELD

Various embodiments relate generally to execution units for calculating with masked data.

BACKGROUND

Within the scope of security-relevant applications, computer chips, such as computer chips on a chip card or in a control apparatus in a vehicle, for example, typically carry out cryptographic operations for encryption, decryption and authentication, etc. In the process, data such as cryptographic keys, for example, which should be protected from access by an attacker, are processed. A typical securing mechanism lies in the masking of data to be processed. Since masking and processing of masked data however requires additional computational outlay (and corresponding hardware outlay), execution units that facilitate calculations with masked data with little additional hardware outlay are desirable.

SUMMARY

According to one embodiment, an execution unit is provided, which includes a mask generator circuit configured to generate a mask by multiplying a mask generation vector by blocks of codewords of a plurality of cyclic codes, a masking circuit configured to mask data to be processed by means of the mask, and an arithmetic logic unit configured to process the masked data by means of additions and rotations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a flowchart elucidating a method for calculating with masked data according to one embodiment.

DESCRIPTION

The following detailed description relates to the attached figures, which show details and embodiments. These embodiments are described in such great detail that a person skilled in the art can carry out the invention. Other embodiments are also possible, and the embodiments can be modified from a structural, logical and electrical point of view without deviating from the subject matter of the invention. The various embodiments do not necessarily preclude one another; instead, various embodiments can be combined with one another such that new embodiments arise. Within the scope of this description, the terms "connected", "attached" and "coupled" are used to describe both a direct and indirect connection, a direct or indirect attachment, and a direct or indirect coupling.

Figure 1:
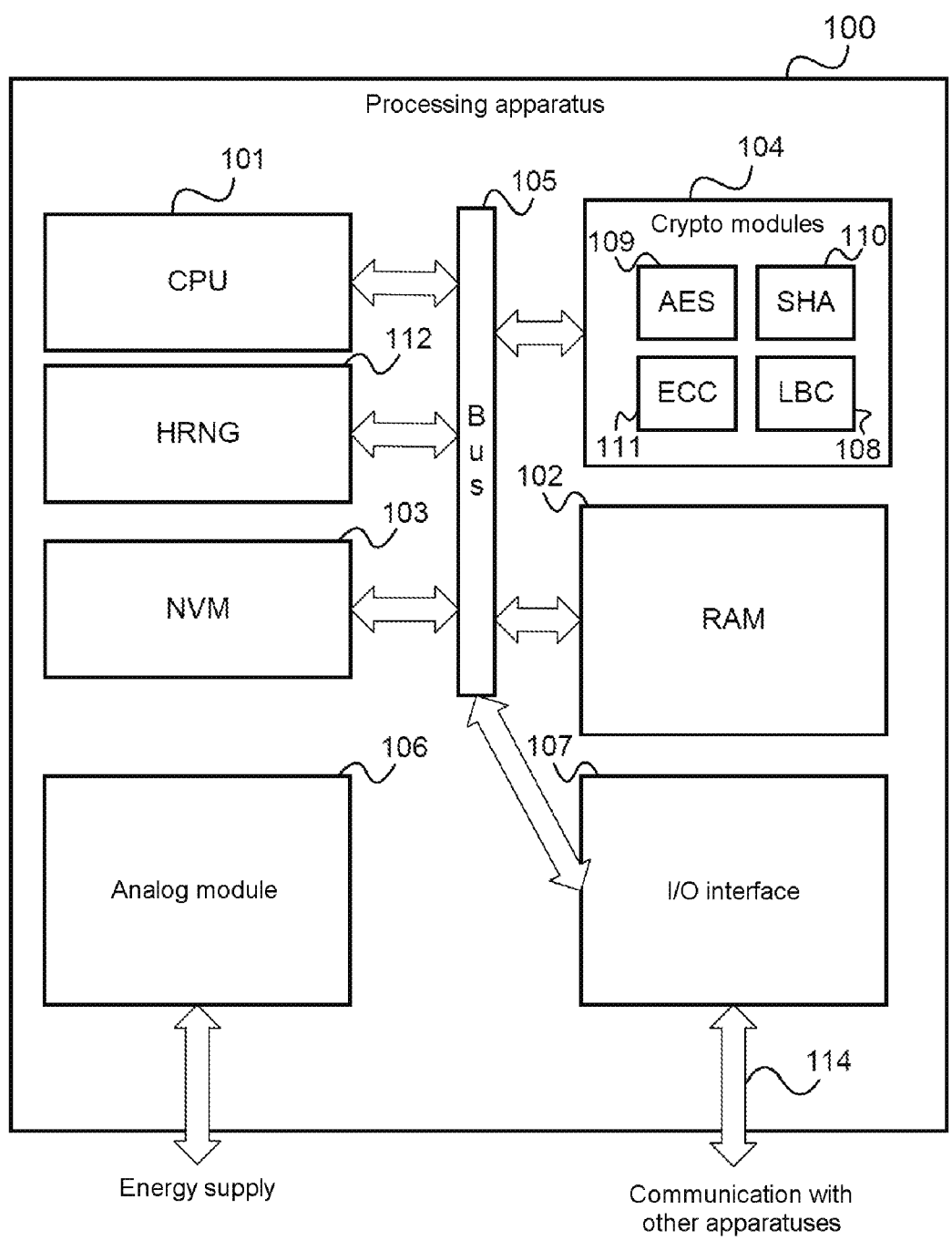
FIG. 1 shows an example of a processing apparatus for carrying out cryptographic operations.

FIG. 1 shows an example of a processing apparatus 100 with a CPU 101, RAM (random access memory) 102, nonvolatile memory 103 (NVM), a crypto module 104, an analog module 106, an input/output interface 107 and a hardware random number generator 112.

In this example, the CPU 101 has access to at least one crypto module 104 via a common bus 105, to which each crypto module 104 is connected. In various embodiments, each crypto module 104 may include one or more crypto cores in order to carry out certain cryptographic operations. Exemplary crypto cores may include:

an AES core 109,
a SHA core 110,
an ECC core 111, and
a lattice-based crypto (LBC) core 108.

The lattice-based crypto core 108 may be provided to accelerate lattice-based cryptography.

The CPU 101, the hardware random number generator 112, the NVM 103, the crypto module 104, the RAM 102 and the input/output interface 107 are connected to the bus 105. The input/output interface 107 may have a connection 114 to other apparatuses that are similar to the processing apparatus 100.

The analog module 106 is supplied with electrical energy via an electrical contact and/or via an electromagnetic field. This energy is supplied in order to drive the circuits of the processing apparatus 100 and this energy can, for example, allow the input/output interface to establish and/or maintain connections to other apparatuses via the connection 114.

The bus 105 itself can be masked or simple. Instructions for carrying out the processing and the algorithms, which are described below, can be stored in the NVM 103 and processed by the CPU 101, in particular. The processed data can be stored in the NVM 103 or in the RAM 102. Random numbers are supplied by the hardware random number generator 112.

The processing and the algorithms described below can be carried out completely, or at least in part, on the crypto module 104. A crypto module 104 can be equipped with hardware-based security mechanisms. Such hardware-based security mechanisms can be circuits that implement countermeasures against side channel power analysis or error injection (e.g., using a laser). Such countermeasures could be realized by the use of randomization, redundant hardware or redundant processing. In general, it is the object of countermeasures to hide the internally processed values and intermediate results from an attacker who is able to observe the physical effect of the processing of such values.

By way of example, the components of the processing apparatus 100 can be implemented on a single chip. The processing apparatus 100 may be a chip card (or chip card module), which is supplied by direct electrical contact or by an electromagnetic field. The processing apparatus 100 can be a fixed circuit or can be based on reconfigurable hardware (e.g., a field programmable gate array, FPGA). The processing apparatus 100 can be connected to a personal computer, microcontroller, FPGA or a smartphone system on a chip (SoC) or other components of a smartphone. The processing apparatus 100 can be a chip, which acts as a trusted platform module (TPM) and which provides cryptographic functionality to a computer, smartphone, Internet of things (TOT) appliance or vehicle according to a standardized interface.

Arbitrary precision multipliers operating in serial-parallel fashion are a core component of many cryptographic coprocessors (such as the crypto modules 104) for efficiently calculating public-key crypto methods such as RSA or cryptography with elliptic curves. By way of example, such multipliers are used in the arbitrary precision execution units of chip cards or in authentication tokens.

An arbitrary precision multiplier operating in serial-parallel fashion consists of an arbitrary precision register (Accu), the accumulator, for storing intermediate results of the multiplication, an adder unit, a shifter and components for calculating partial products of operands and reduction values. During a multiplication, one operand to be multiplied is used in parallel and the other operand is used in series with respect to the employed number representation (typically bit-serial for operands in binary representation). At the start of the multiplication, the Accu is normally set to zero. Then, the current content of the Accu is shifted by one position in a loop and partial products of the first operand (depending on the position of the second operand) and reduction values (depending on the current content of the Accu) are added. Here, the operand used in series can be processed starting at the most significant position or starting at the least significant position. Particularly for implementing protocols for elliptical curves over finite fields $GF(2^n)$ of characteristic 2, the use of such multipliers is advantageous on account of the simple circuit arrangement, the low area requirement and the high implementation speed.

As a result of working through one of the operands in series, such multipliers, however, are inherently susceptible to attacks on the confidentiality of data. Often, it is sufficient for an attacker to observe merely a single signal of the circuit arrangement, for example by means of a probing needle, in order to obtain the complete content of the operands processed in the multiplier since the complete value of operands and/or calculated values is shifted through the observed register on account of the serial data processing.

Masking data is a security mechanism against the readout of data by an attacker. Typically, secret-sharing schemes are used to mask confidential data and operands. In the case of a d-of-n secret-sharing scheme, a bit $b \in \{0, 1\}$ to be protected is stored as a tuple $(b_1, \ldots, b_n) \in \{0, 1\}^n$ of n so-called shares, wherein the following applies:

the value of the stored bit b can be uniquely reconstructed with knowledge of any d bits $b_{i_1}, \ldots, b_{i_d}$ of the tuple $(b_1, \ldots, b_n) \in \{0, 1\}^n$ with $1 \leq i_1 \leq i_2 < \ldots < i_d \leq n$ and knowledge of fewer than d bits of the tuple $(b_1, \ldots, b_n) \in \{0, 1\}^n$ provides no information item (within the meaning of information theory) about the stored bit.

A d-of-n secret-sharing scheme defines a family of probability distributions with the properties that fewer than d distributions are statistically independent and d or more distributions depend on one another, with the dependence being given by the bit b to be protected.

In a simple implementation of the n-of-n secret-sharing scheme, n−1 identical, uniformly distributed and independent random bits $b_1, \ldots, b_{n-1}$ are generated. The bit $b_n$ is then defined by $b_n := b_1 \oplus \ldots \oplus b_{n-1} \oplus b$. However, during this procedure, the information to be stored is increased to n-times thereof. In the case of an arbitrary precision execution unit, n-fold calculation and storage of the required bignum and intermediate results is typically not practical.

Alternatively, the check matrix of a (n, k, d) linear code with the code word length n, dimension k and minimum distance d can be used for generating suitable masks. After construction, the codewords have the property that no linear combination of fewer than d codewords can yield the zero vector. If the codewords are considered to be the columns of a $n \times 2^k$ matrix M, up to $2^k$ masking bits can be generated by matrix multiplication r*M with a n-bit random number vector (mask generation vector) r. These masking bits have the property that up to d−1 masked data bits and bits of the random number vector provide no information about the masked data. With the aid of this construction, it is possible to generate very compact d-of-n secret-sharing schemes, which require significantly less storage space than the simple masking method described. Here, only the masked data and the random number vector r for producing the masked bits are stored. The associated mask bits can be calculated on the fly using the matrix M for masking and demasking data and therefore need not be stored.

In general, however, it is not possible to carry out all calculation operations required for carrying out arbitrary precision multiplication directly on the masked data in the case of d-of-n secret-sharing schemes for masking confidential data. The employed masking method must have suitable homomorphic properties in order to be able to directly calculate with masked data. This means that the steps for data masking and the calculation operations can be interchanged: the result must not change if the data are initially linked in respect of a calculation operation and subsequently masked, or if the operands are masked first and subsequently linked with a (then possibly different) calculation operation. Such a homomorphism renders it possible to calculate directly with masked operands.

It is possible to find efficient masking schemes which are homomorphic with one of the required calculation operations: by way of example, linear codes over $GF(2^n)$ are interchangeable with the bitwise XOR (exclusive OR) operation and residue class codes modulo Z/nZ are interchangeable with integer addition. However, there often are no suitable masking methods that are interchangeable with all required calculation operations. For the case of an arbitrary precision multiplier for $GF(2^n)$, the masking method must be at least interchangeable with the bitwise XOR operation and shift operations. Although the described simple masking method of a n-of-n secret-sharing scheme has all homomorphic properties required to this end, it is (just like other cyclic linear codes) inefficient in respect of the necessary storage space for the shares of the masked data.

The following describes a procedure for constructing memory-space-efficient masking schemes, which are homomorphic with bitwise XOR operation and only have few bit errors in respect of the homomorphism with (cyclic) shift operations. These properties are sufficient to be able to implement an arbitrary precision multiplier over GF (2n) that is optimized in respect of gate complexity, area requirements and power intake and that calculates in completely masking fashion, as is required, for example, for cryptographic protocols on the basis of elliptic curves over finite fields of characteristic 2. A randomization of internal states that are measurable from the outside is achieved by the masking schemes.

According to various embodiments, the procedure includes or essentially consists of concatenating a plurality of cyclic linear (w, k, d) codes over $GF(2^w)$ such that the concatenation of the masking maps, which are formed from the dual maps of the respective partial codewords, as described above, are compatible with one another as a code and do not reduce the minimum distance of the respective other partial code. After construction, the masking scheme formed in this way is directly homomorphic with the XOR operation and up to d−1 masked data and random number bits disclose no information about the data stored in a masked fashion.

If the masked data are shifted in cyclic fashion, the shift operation, after construction, is likewise already homomorphic with the respective partial masks formed from the cyclic codewords. Errors may only occur at the transition positions between the partial masks (corresponding to the transition positions between blocks of codewords of the concatenated codes) and the mask of the shifted result must be corrected accordingly at these transition positions. However, this only requires a fraction of the outlay for the complete calculation of the mask bits of the entire masked datum. Additionally, the required correction values are functions of the employed code known in advance.

This procedure facilitates the following:
The masks for masking bignums can be calculated on the fly from relatively short random number vectors. As a result, the storage requirements for storing the masked bignums is significantly reduced in comparison with the above-described, simple masking method.
The partial codes used to construct the masking functions, following construction, are homomorphic with the XOR operation and also homomorphic in respect of shift operations on the respective partial mask.
The construction ensures that the masking scheme can be extended to a method that is homomorphic with respect to shift operations with little additional outlay (in terms of area requirements and gate complexity). The additional error requirement and the additional power intake of the resultant circuit only make up a fraction of the outlay required to calculate the entire masking pattern.

For elucidation purposes, an example of a masking scheme according to one exemplary embodiment is specified below, said masking scheme producing a 60-bit mask from a 20-bit random number string. Here, the mask has the property that an attacker must know at least 5 bits of the set of the masked data bits and/or of the employed random number string in order to learn a single masked data bit. (This means that the associated dual code has a minimum distance of 5.)

To this end, the following $\{0, 1\}^{20 \times 60}$ matrix M is defined:

```
10000000000000010111 10000000000001100011 10000100000010000011
11000000000000001011 11000000000000110001 11000010000001000001
11100000000000000101 11100000000000011000 11100001000000100000
11110000000000000010 01110000000000001100 01110000100000010000
01111000000000000001 00111000000000000110 00111000010000001000
10111100000000000000 00011100000000000011 00011100001000000100
01011110000000000000 10001110000000000001 00001110000100000010
00101111000000000000 11000111000000000000 00000111000010000001
00010111100000000000 01100011100000000000 10000011100001000000
00001011110000000000 00110001110000000000 01000001110000100000
00000101111000000000 00011000111000000000 00100000111000010000
00000010111100000000 00001100011100000000 00010000011100001000
00000001011110000000 00000110001110000000 00001000001110000100
00000000101111000000 00000011000111000000 00000100000111000010
00000000010111100000 00000001100011100000 00000010000011100001
00000000001011110000 00000000110001110000 10000001000001110000
00000000000101111000 00000000011000111000 01000000100000111000
00000000000010111100 00000000001100011100 00100000010000011100
00000000000001011110 00000000000110001110 00010000001000001110
00000000000000101111 00000000000011000111 00001000000100000111
```

It is possible to identify that M was formed from the concatenation of 3 blocks, each of 20 cyclic shift operations of words from $\{0, 1\}^{20}$. In each partial block, the columns of the matrix form codewords of a code with a minimum distance of 5. Moreover, the blocks are chosen in such a way that this property is maintained for all 60 columns of the matrix M. What follows from this, for example, is that up to 4 columns of M are linearly independent over GF(2) in each case.

The following is carried out to mask a data word $w \in \{0, 1\}^{60}$ to be masked:
1) generating a 20-bit random number string $r \in_R \{0, 1\}^{20}$
2) calculating, by matrix multiplication, the 60-bit mask $m = r * M$
3) generating the masked data word $f(w, r) := w' = w \oplus m$ by bitwise XOR operation with the mask.

Only the masked data word and the random number string $(w', r) \in \{0, 1\}^{80}$ are stored in the memory.

Let $f(w_1, r_1), f(w_2, r_2) \in \{0, 1\}^{80}$ be masked data words and ROTL1(x) denote the cyclic rotation of a bit string x by one position to the left. Then, the following calculation rules apply:

$$f(w_1,r_1) \oplus f(w_2,r_2) = (w_1 \oplus r_1 * M) \oplus (w_2 \oplus r_2 * M) = w_1 \oplus w_2 \oplus (r_1 \oplus r_2) * M = f((w_1 \oplus w_2), r_1 \oplus r_2) \text{ and} \quad \text{R1)}$$

$$f(ROTL1(w_1), ROTL1(r_1)) = ROTL1(f(w_1,r_1)) + r_1 * E_L, \quad \text{R2)}$$

where the correction map $E_L$ for the calculation example is given by the following $\{0, 1\}^{20=60}$ matrix:

```
00000000000000000000 00000000000000000000 00000000000000000000
00000000000000000000 00000000000000000000 00000000000000000000
00000000000000000001 00000000000000000000 00000000000000000001
00000000000000000000 00000000000000000000 00000000000000000000
00000000000000000001 00000000000000000000 00000000000000000001
00000000000000000001 00000000000000000001 00000000000000000000
```

```
00000000000000000001 00000000000000000001 00000000000000000000
00000000000000000000 00000000000000000001 00000000000000000001
00000000000000000000 00000000000000000000 00000000000000000000
00000000000000000000 00000000000000000000 00000000000000000000
00000000000000000000 00000000000000000000 00000000000000000000
00000000000000000000 00000000000000000000 00000000000000000000
00000000000000000000 00000000000000000000 00000000000000000000
00000000000000000000 00000000000000000000 00000000000000000000
00000000000000000000 00000000000000000001 00000000000000000001
00000000000000000000 00000000000000000000 00000000000000000000
00000000000000000000 00000000000000000000 00000000000000000000
00000000000000000000 00000000000000000000 00000000000000000000
00000000000000000000 00000000000000000000 00000000000000000000
00000000000000000000 00000000000000000000 00000000000000000000
```

What follows directly from the construction of the masking method is that the matrix $E_L$ can only have entries that differ from 0 at the (right edges of the) transition positions between the blocks of cyclical partial codes.

All employed matrix multiplications can be realized by combinatorial circuits with little depth made of XOR gates.

On the basis of the calculation rules R1 and R2, above, it is possible to construct an arbitrary precision multiplier, operating in fully masked fashion, over a finite field $GF(2^{60})$. To this end, the following further hardware components are used according to one embodiment:

For a secure implementation of a $GF(2^n)$ multiplier, the masking of operands and intermediate results is refreshed with new random numbers in various operating steps. Naturally, the confidentiality of the masked data should not be endangered in the process. In order to refresh the masking of a stored bignum $(w_1', r_1)$ with new random number bits, a new random number string s is initially generated. The bignum stored in a masked fashion is then replaced by the value $f(v_1, r_1 \oplus s) = w_1' \oplus s*M$. Here, no unmasked bits of the bignum are calculated or used at any time during the refresh.

If the content of the accumulator is shifted while a multiplication is carried out, further bits in addition to the rotation are modified depending on the current value of the MSB (most significant bit). This modular reduction step depends on an irreducible polynomial $p(x) \in GF(2)[x]$ of degree n in the case of a polynomial representation of the field elements of $GF(2^n)$, said polynomial setting the specific representation of field elements as coefficient vectors of a vector space of dimension n over $GF(2)$. By feedback of the masked value of the most significant bit to further bit positions according to $p(x)$, the masks of different bits are linked to one another and need to subsequently be adapted by suitable correction terms in order to obtain a correctly masked representation of the result. Possibly, this process may reduce the minimum distance of the dual code used for the construction of the masking matrix M. In order to prevent such reduction in the minimum distance, the intermediate result of the rotation can be refreshed with new random numbers or the minimum distance of the employed dual code can be suitably increased.

Partial products of the operand processed in parallel are calculated and added to the current content of the accumulator depending on a bit of the operand processed in series. In order not to endanger the confidentiality of the operands, these are stored in masked fashion and the calculated partial products must also be suitably masked. In the case of a multiplier over $GF(2^n)$, the calculation of the partial products consists of a bitwise AND operation of the parallel operand and the currently processed bit of the series operand. By way of example, threshold-implementation techniques can be used to securely implement these AND operations, which threshold-implementation techniques are also used for the side-channel-resistant implementation of symmetric encryption functions. A circuit analogous to the Trichina AND gate allows a confidential calculation of an AND operation of Boolean values present in shares.

In a manner analogous to the above-described construction method, it is possible to construct a correction map $E_R$ for the cyclic rotation ROTR1(x) of a bit string x by one position to the right. What also applies to the correction map $E_R$ is that the associated matrix can only have entries that differ from 0 at the (left edges of the) transition positions between the blocks of cyclic partial codes.

In one embodiment, the partial blocks of the masking matrix M are chosen in such a way that the sum of the summands in the columns of the correction maps $E_L$ and/or $E_R$ is minimal. That is to say, the Hamming weight of the matrices of the correction maps $E_L$ and/or $E_R$ is minimized.

In a further exemplary embodiment, the partial blocks of the masking matrix M are chosen in such a way that the maximum number of the summands in the respective columns of the correction maps $E_L$ and/or $E_R$ is minimal.

Described below is an exemplary embodiment of a masked serial-parallel multiplier, for example for realizing a computing unit, coupled to a register array, for implementing cryptographic methods by way of binary elliptic curves.

An elliptic curve can be defined over a binary extension field $GF(2^n) = F_{2^n}$ (also known as a binary field or field with characteristic 2), which can be defined by a degree-n polynomial $f(x)$, which is irreducible over $GF(2)$, as $GF(2^n) = F_2[x]/(f(x))$.

An element $a(z) \in GF(2^n)$ can be represented by polynomial of maximum degree n−1 with binary coefficients. Addition of field elements is the addition of binary polynomials, and multiplication is implemented modulo $f(x)$. A field element $a(x) = a_{n-1}x^{n-1} + \ldots + a_1x + a_0 \in F_{2^n}$ corresponds to a vector $a = (a_{n-1}, \ldots, a_1, a_0)$. The addition $F_{2^n}$ is only the XOR operation, which is applied accordingly to two vectors (there is no carryover propagation, as would be the case for elliptic curves over $GF(p)$). The shift-and-add method can be used for the multiplication. The notation b(j) or the alternative notation is used to denote the access to the bit j of the n-bit vector b.

Figure 2:
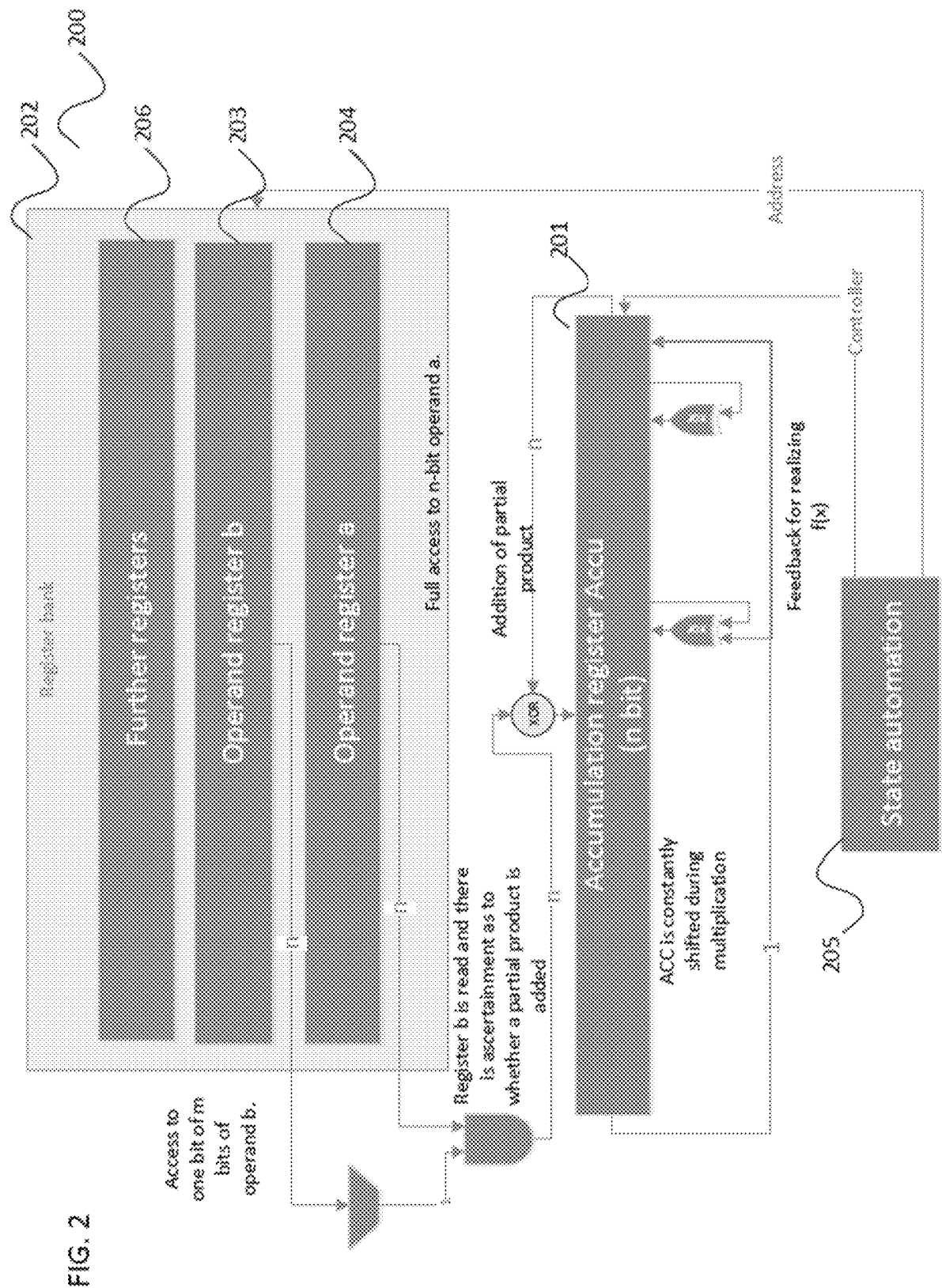
FIG. 2 shows a realization of multiplication in hardware.

FIG. 2 elucidates a realization of multiplication in hardware.

It includes an ALU (arithmetic logic unit) 200, which can carry out field additions and field multiplications. The ALU 200 has a control logic 205 and an accumulation register (Accu) 201 of n bits, which is connected to a register bank 202 containing a certain number of operands of n bits in operand registers 203, 204 and 206. The address set up on the register bank is chosen in such a way that the ALU 200 can access two operands a, b∈GF($2^n$). For reasons of simplicity, the assumption can be made that the register bank 202 allows access to a full n-bit wide operand a and to one bit of the n-bit wide operand b. The basic operations carried out by the ALU are as follows:

a) Loading a value into the accumulation register Accu 201 from the register bank 202 and writing back.

b) Shifting the value in the Accu 201 to the left without modular reduction by f(x).

c) Shifting the value in the Accu 201 to the left with modular reduction by f(x). This corresponds to multiplication by the unknown x.

d) Adding (i.e., XOR) an operand to the value in the Accu 201.

e) Multiplying two operands a, b∈$F_{2^n}$ such that Accu=mod f(x). This can be implemented using the left-to-right shift-and-add algorithm: let Accu=(Accu<<1) XOR $b_i$*a mod f(x) for i from n−1 to 0.

In order to assist the field multiplication, the ALU 200 and the associated control logic 205 support an operation which initializes the Accu 201 with zero and then, for n cycles, shifts the content of the Accu 201 to the left reduced by f(x) and, depending on a selected bit $b_i$ of the operand b, the full operand a is added to the content of the Accu 201. This is a combination of the above-described basic operations.

In order to carry out elliptic curve cryptography (ECC), the control logic (state automaton) 205 carries out a given sequence of additions and multiplications and provides the correct addresses of the operands of the register bank 202 (in order to load and store the correct operands; by way of example, using the correct addition formula for the double-and-add algorithm or the Montgomery-Ladder algorithm) and writes the final result in the Accu 201 to the correct position into the register bank 202. To this end, the register bank 202 may also contain additional temporary data in one or more further registers 206, which are not accessed during an individual multiplication, but which are required for the implementation of the addition formula of the elliptic curve points.

A typical problem is that an attacker who is able to read values from a line leading to the operand register 203 that stores the operand b (e.g., downstream of a multiplexer of the operand register 203) is able to read the whole value of b since b is normally called in sequence (on account of the left-to-right multiplication algorithm) during multiplication.

Figure 3:
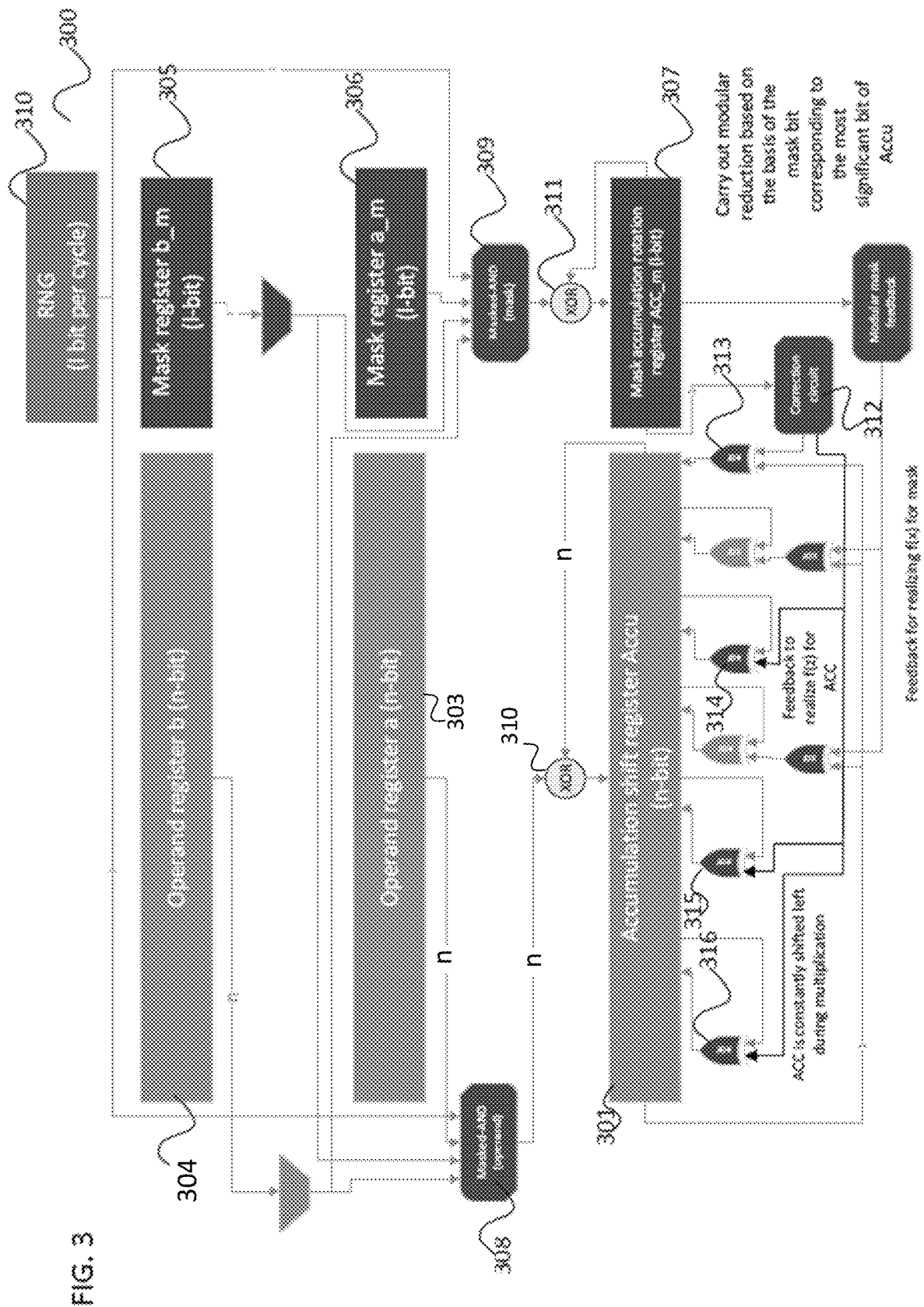
FIG. 3 shows a masked ALU according to one embodiment.

FIG. 3 shows a masked ALU 300, which uses a code with minimum distance d for masking purposes. Therefore, it is necessary in this implementation for an attacker to observe at least d lines in order to derive a meaningful information item about the employed operands. However, it should be observed that the masked ALU does not protect any information items of the control flow (e.g., addresses of operands or the sequence of mathematical operations).

Like in the ALU 200, the ALU 300 has an Accu 301, a control logic (not shown) and a register bank with operand registers 303, 304.

The operand register 304 for the value b is read sequentially (only one bit is accessed at any one time).

There is a complete (i.e., n-bit wide) access to the operand register 303 for the n-bit value a.

Using the notation above, a random number vector r∈$_R$ {0, 1}$^1$ of length 1 was selected, and r was used to mask the content of a register of length n. The associated matrix M consists of the concatenation of cyclic code matrices of dimension 1×1.

The length l of a random number value is shorter than the length of an operand (and operand register) of length n. A value is masked using a derived mask x'=r*M of length n.

In general, all variables are only stored in masked form (in the Accu 301 and in the register bank) and processed in masked fashion, and operations are carried out in such a way that the value after an operation can be correctly demasked.

In general, the masking is present for each operation during a calculation and the masking is only removed once a result, and consequently non-security-relevant data, leave the crypto core.

Compared to the ALU 200, each register 303, 304 in the register bank and the accumulation register Accu 301 in the ALU 300 is extended by mask registers 305, 306, 307 in order to store an additional 1-bit string that is used to derive a mask for a n-bit data value.

There is a full (1-bit wide) access to the mask register 306 for the mask am of a.

In the mask register 305 for the mask $b_m$ of b, the bit of the mask $b_m$*M is accessed, which belongs to the bit of the operand b that is currently accessed. The mask registers 305, 306 for the masks, which belong to the operand registers 303, 304, may also be part of the register bank that can contain additional storage space for masks.

In order to denote registers in the register bank, the notation r[i]* is used to denote a masked n-bit value, where i specifies the entry in the register bank (e.g., i∈0 . . . 9 for a register bank able to store 10 masked values and their masks). The 1-bit mask corresponding to r[i]* is denoted as $r_m$[i]. Consequently, the unmasked value r[i] can be obtained by calculating $r_m$[i]*M XOR r[i]*. The accumulation register 301 is likewise extended: the ALU 300 contains a n-bit register Accu 301 for the masked data and an associated 1-bit mask register $Accu_m$ 307 for the corresponding mask.

The operation (a), which loads data from the register bank at the address i into the accumulation register Accu 301 or which writes these back into the register bank requires no special measures: a masked value r[i]* and the corresponding mask $r_m$[i] are copied from the register bank into the register Accu 301 and $Accu_m$ 307. Storing is copying the data in Accu or $Accu_m$ back to r[i]* or $r_m$[i].

An additional operation (a1) is applied in order to store a value generated by an external entity (e.g., a query) into the register bank and to mask said value or to output an unmasked (plain) result (e.g., a coordinate of a calculated response). This is possible since each operation (b, c, d, e) maintains the relationship for an operand a and its masked representation a' and the mask $x_a$, for which the following applies: a=a'XOR $x_a$*M. Consequently, a unit that has access to the masked value and the mask can carry out the loading and saving operations into the register bank, where unmasked data are copied to the output port of the unit or unmasked data are stored in the register bank in masked fashion.

The implementation of the XOR operation (d) is uncomplicated on account of the linearity. Two masked values a'=XOR $x_a$' and b'=b XOR x'$_b$, which are stored in the register bank as masked m-bit values a'=r[i]*, b'=r[i]* and 1-bit mask values $x_a$=$r_m$[i], $x_b$=$r_m$[j], are independently linked by the calculation of Accu=c'=a' XOR b' (masked value) and $Accu_m = x_c = x_a$ XOR $x_b$ (masks). In general, this means loading an operand into Accu or $Accu_m$ and then combining the other operand by means of XOR with Accu or $Accu_m$ and writing the result back into the register bank. The mask $x'_c$ can be removed from c' by:

$$c' \text{ XOR } x_c * M = a \text{ XOR } b = c.$$

Not much additional logic is necessary for the one-position shift processes (b). Assume that a masked operand was loaded in Accu 301 and its mask was loaded in $Accu_m$ 307 (as described for operation (a)). A virtually correct result can be obtained by virtue of Accu 301 being shifted by one position to the left and $Accu_m$ being rotated by one position to the left. This is implemented in the mask register 307. Corrections of the employed masks are necessary at the transition positions between the cyclic partial codes.

The masking is taken into account when a left-shift operation is calculated together with a reduction modulo f(x) (operation (c)). An efficient way for implementing the modular reduction for non-masked implementations, if $f(x) = x^n + x^\gamma + x^\beta + x^\alpha + 1$ and the n+1-bit operand is provided in the Accu 301, requires a modular reduction to be carried out if Accu(n)=1 by virtue of the bits being set in bits set in f(x) or being XOR processed:

$$Accu(n) = 0, Accu(\gamma) = Accu(\gamma) \text{ XOR } 1, Accu(\beta) = Accu(\beta) \text{ XOR } 1,$$

$$Accu(\alpha) = Accu(\alpha) \text{ XOR } 1, Accu(0) = Accu(0) \text{ XOR } 1.$$

This can be further simplified by virtue of the following being calculated in every shift to the left, where Accu(n) need not necessarily be stored but can also be generated on the fly during shifting:

$$Accu(\gamma) = Accu(\gamma) \text{ XOR } Accu(n),$$

$$Accu(\alpha) = Accu(\beta) \text{ XOR } Accu(n),$$

$$Accu(\alpha) = Accu(\alpha) \text{ XOR } Accu(n), Accu(0) = Accu(0) \text{ XOR } Accu(n), Accu(n) = 0.$$

The relationship between the masked data and the mask must be maintained for the correct functionality. Logically, a reduction has to be carried out if Accu(n) XOR $Accu_m$(n mod 1)=1 since this is the demasked logic value (it should be observed that the variable n has two different meanings in this context).

However, the demasking may lead to a security vulnerability since the data are processed in plain text (unmasked). Therefore, the modular reduction modulo $f(x) = x^m + x^\gamma + x^\beta + x^\alpha + 1$ can be calculated (integrated into the shifting to the left) as the following on the masked ALU 300:

$$Accu(\gamma) = Accu(\gamma) \text{ XOR } Accu(n) \text{ XOR } Accu_m(n \bmod 1),$$

$$Accu(\beta) = Accu(\beta) \text{ XOR } Accu(n) \text{ XOR } ALU_m(n \bmod 1),$$

$$ALU(\alpha) = Accu(\alpha) \text{ XOR } Accu(n) \text{ XOR } Accu_m(n \bmod 1), Accu(0) = Accu(0) \text{ XOR } Accu(n) \text{ XOR } Accu_m(n \bmod 1), Accu(n) = 0$$

Ideally, the two XORs at Accu(n) and $Accu_m$(n mod 1) are arranged in such a way that no signal carries plain text by virtue of a fresh random value being added therebetween.

A multiplication modulo f(x) in the finite field (operation (e)) uses the above-described functional blocks.

The left-shift and the reduction in the loop of operation (e) can be realized using the procedure described for operation (c). However, the conditional parallel addition of the operand a depending on the value of the operand b(j) read in series must be carried out with the masking being taken into account. In the plain text ALU 200, this operation consists of setting Accu(i)=Accu(i) XOR (b(j) AND a(i)) for i from 0 to n−1 in each iteration of the main loop (i.e., the loop over the positions of the operand b, j from n−1 to 0), wherein the "if" is realized as AND gate 207 (value a is only XOR-processed if b(j)=1).

For the masked ALU 300, reference is made to two masked operands for the multiplication a'=a XOR $x_a'$ and b'=b XOR $x'_b$, said operands being stored in the register file as masked n-bit values a'=r[i]*, b'=r[j]* and 1-bit mask values $x_a = r_m[i]$, $x_b = r_m[j]$.

One option consists of calculating $b(j)_{plain} = b'(j)$ XOR $x_b$(j mod 1) and then carrying out the addition if $b(j)_{plain} = 1$. However, this would lead to operations in plain text.

In order to achieve a secure conditional addition of a', $x_a$ to Accu and $Accu_m$ depending on the value of b'(j) and $x_b$(j mod 1) in the iteration j∈n−1 to 0, use is made of a masked and randomized AND gate for the parallel addition combined with a mask update (or refresh) using random or pseudo-random bits. The masked AND gate is similar to a masked Trichina AND gate. The conditional addition of operand a is carried out separately on the masked data and on the mask. This is carried out by a masked AND (operand) 308 and a masked AND (mask) 309.

The masked AND (operand) 308 adds depending on the read bit of the operand B and the mask bit of the operand a. The addition is randomized by 1-bits of a random number generator 310. Consequently, the selection of partial products is protected.

The addition of the partial product is implemented by a first XOR 310 and the addition of the newly generated mask is implemented by a second XOR 311.

Figure 4:
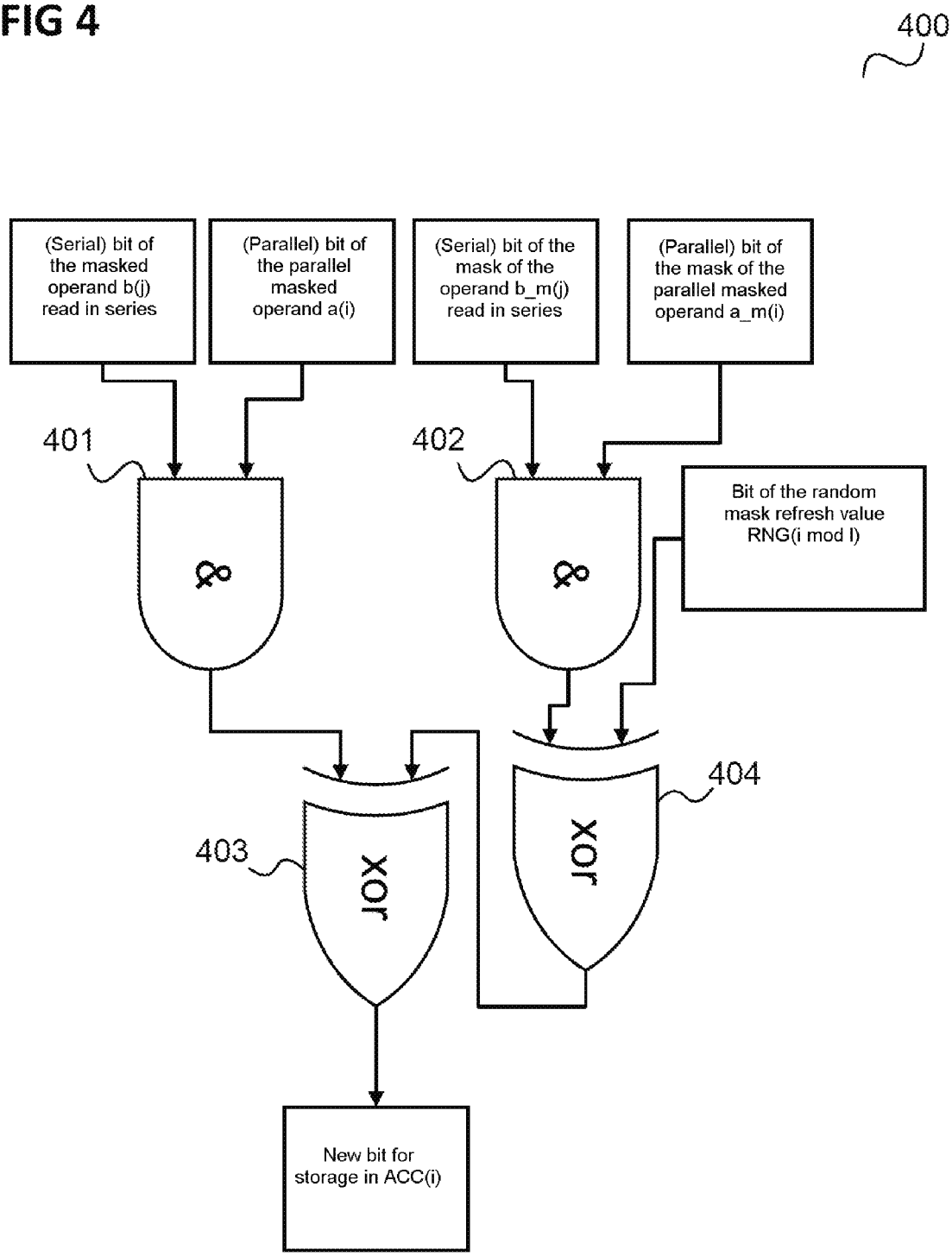
FIG. 4 shows a gate for implementing a masked AND operation.

The circuit illustrated in FIG. 4 can be used to realize the masked AND operations 308, 309.

FIG. 4 shows a gate 400 for implementing a masked AND operation.

The masked AND operation instantiates n instances of a single masked AND gate for i from 0 to n−1 for the Accu 301. The bit b(j) is selected for j from n−1 to 0 by the control logic (state machine). Additionally, the gate 400 is repeated 1-times for $Accu_m$, with accesses to b and a being replaced by accesses to $b_m$ and $a_m$.

The gate 400 has two AND gates 401, 402 and two XOR gates 403, 404, and calculates:

$$u(i) = (b(j) \text{ AND } a(i)) \text{ XOR } ((b_m(j) \text{ XOR } a(i)) \text{ XOR } r(i \bmod l)) = (b(j) \text{ XOR } b_m(j)) \text{ AND } a(i) \text{ XOR } r(i \bmod l)$$

for the inputs of the first AND gate 401, which is connected to the XOR 311, and $$u_m(i) = (b_m(j) \text{ AND } a_m(i)) \text{ XOR } ((b_m(j) \text{ XOR } a_m(i)) \text{ XOR } r(i \bmod l)),$$

for the inputs of the second AND gate 402, that is connected to $ACC_m(i)$ 307.

Consequently, Accu(i)=Accu(i) XOR u(i) and $Accu_m(i) = Accu_m(i)$ XOR $u_m(i)$ are calculated in the ALU 300. The gate 400 carries out the intended logic function for b(j) AND a(i) (for a, b in plain text) in protected fashion. Here, the masked AND gate should be chosen in such a way that, here too, the safety level against attack is matched to the safety level of the mask.

Moreover, a correction circuit 312 is provided (see correction map $E_L$). It receives 1 bits from Accu_m 307. The outputs of the correction circuit 312 are connected to XORs 313, 314, 315, 316, to which the correction circuit 312 supplies a correction bit. By means of their other inputs, the XORs 313, 314, 315, 316 receive the bit of the Accu 301 to be corrected. The result of the XORs 313, 314, 315, 316 is the correction carried out by the correction circuit 312 and it is supplied back to the Accu 301.

An additional security measure lies in adding a random bit r to the bit of the masked operand b(j), read in series, and its mask $b_m(j)$. Since the random bit is added to both the shares, it does not influence the correctness of the calculation.

The masked ALU (and a corresponding execution unit containing the masked ALU) can be applied independently and/or in complementary fashion to other security mechanisms in cryptography applications, e.g., on the basis of elliptic curves. In various embodiments, randomization or bedazzling countermeasures such as a randomized representation of elliptic curve points in projective coordinates do not influence the masked ALU.

Figure 5:
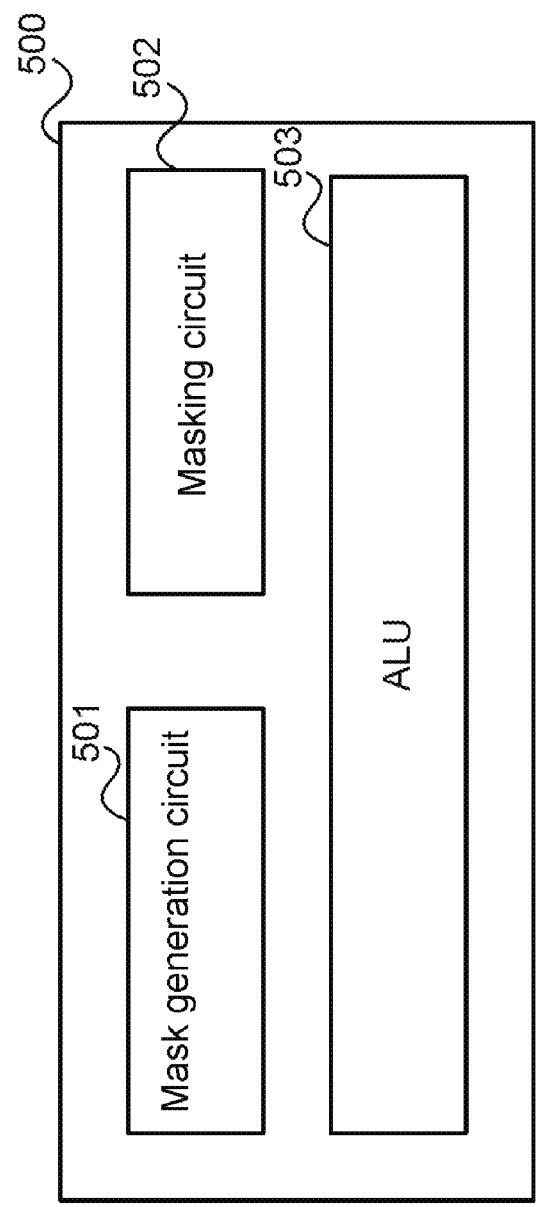
FIG. 5 shows an execution unit according to one embodiment.

In summary, an execution unit, as illustrated in FIG. 5, is provided in various embodiments.

FIG. 5 shows an execution unit 500 according to one embodiment.

The execution unit 500 has a mask generation circuit 501, which is configured to produce a mask by multiplying a mask generation vector with blocks of codewords of a plurality of cyclic codes.

Moreover, the execution unit 500 has a masking circuit 502, which is configured to mask data to be processed by means of the mask.

Further, the execution unit 500 has an arithmetic logic unit 503, which is configured to process the masked data by means of additions and rotations.

Expressed differently, a masking vector is generated on the basis of a concatenation of codeword blocks (codeword matrices) by two or more different cyclic codes according to one embodiment.

The codewords of the various cyclic codes emerge from one another by shifts. Expressed differently, all codewords could be generated for each of the cyclic codes by virtue of any codeword of the code being selected and being shifted bit-by-bit in cyclic fashion, with a new codeword arising after each 1-bit shift.

The codes are different to the extent that they differ in at least one or else several or all codewords.

Each of the codes has at least one predetermined minimum Hamming distance and the codes among themselves likewise have at least the predetermined minimum Hamming distance.

According to one embodiment, the mask generation vector has the length of a codeword. As the number of used blocks of codes increases, the smaller the mask generation vector becomes in comparison with the generated masking vector. In this way, the storage requirement for the mask is significantly reduced (in relation to the use of a full masking vector).

In various embodiments, the procedure of FIG. 5 facilitates an area-optimized implementation of an arbitrary precision multiplier over finite fields $GF(2^n)$ that operates in fully masked fashion.

The processing of the data may include a multiplication of two operands, during which the two operands are combined by means of a masked AND operation. Here, the mask (e.g., a mask bit) can be refreshed for each AND operation. By way of example, in the embodiment of FIG. 3, random information from the RNG 310 is included in the masked AND operations 308, 309. As a result, the contents of Accu 301 and Accu_m are repeatedly masked anew on the basis of random number values.

Compared to an n-of-n secret-sharing scheme, the masking mechanism according to FIG. 5 requires less hardware outlay since there is no need for an n-fold calculation and storage of the required bignums and intermediate results. The masking according to FIG. 5 can be realized with significantly less hardware outlay (and hence with reduced power consumption) or, in the case of a software implementation, with significantly fewer computational operations and lower storage requirements. Consequently, the safety of confidential data from attacks can be ensured efficiently. In this context, it should also be noted that a realization in software on a microcontroller or a CPU (e.g., on a chip card) is also possible instead of a realization by means of dedicated hardware components.

Written in matrix form, the masking vector is produced by the left-multiplication of the mask generation vector by a matrix, wherein the matrix corresponds to a concatenation of sub-matrices, wherein each sub-matrix corresponds to one of the codes and consists of columns, wherein each column is a codeword of the code, wherein, moreover, the codewords (i.e., columns) in the sub-matrix are arranged in such a way that two adjacent codewords (columns) emerge from one another by a cyclic 1-bit shift. Expressed differently, the codewords of the code are written in a sub-matrix in the sequence thereof, as emerges by the generation of the codewords by cyclic shifting of one of the codewords in succession.

By way of example, the data are processed within the scope of a cryptographic operation, for example for a decryption, encryption, signature calculation, response calculation for a challenge-response method, etc.

FIG. 6 shows a flowchart 600, which elucidates a method for calculating with masked data according to one embodiment.

In 601, a mask is generated by multiplying a mask generation vector with blocks of codewords of a plurality of cyclic codes.

In 602, data to be processed are masked by means of the mask.

In 603, the masked data are processed by means of additions and rotations.

Embodiments are specified below.

Embodiment 1 is an execution unit as described with reference to FIG. 5.

Embodiment 2 is an execution unit according to embodiment 1, wherein the arithmetic logic unit has an accumulation shift register for processing the masked data.

Embodiment 3 is an execution unit according to embodiment 1 or 2, wherein the data include a first operand and a second operand and the arithmetic logic unit is configured to rotate the first and the second operand, to add these or both.

Embodiment 4 is an execution unit according to any one of embodiments 1 to 3, wherein the data include a first operand and a second operand and the arithmetic logic unit is configured to multiply the first operand and the second operand.

Embodiment 5 is an execution unit according to embodiment 4, including a masked selection circuit which, for the purposes of realizing the multiplication, carries out a masked AND operation on the first operand and the second operand.

Embodiment 6 is an execution unit according to embodiment 5, wherein the masked selection circuit is configured to refresh the masking of the data to be processed during the masked AND operation.

Embodiment 7 is an execution unit according to any one of embodiments 4 to 6, wherein the multiplication is a multiplication over a finite field $GF(2^n)$.

Embodiment 8 is an execution unit according to any one of embodiments 1 to 7, wherein each block of codewords consists of the codewords of one of the cyclic codes.

Embodiment 9 is an execution unit according to any one of embodiments 1 to 8, including a correction circuit configured to correct errors arising from the inhomogeneity between the blocks of codewords.

Embodiment 10 is an execution unit according to embodiment 9, wherein the correction circuit is configured to correct the errors arising from the transition positions between the blocks of codewords.

Embodiment 11 is an execution unit according to embodiment 9 or 10, wherein the correction circuit is configured to correct the lack of homomorphism of the masking in respect of the shift of data that arises from the transition positions between the blocks of codewords.

Embodiment 12 is an execution unit according to any one of embodiments 1 to 11, wherein all codes have the same codeword length and the codeword length equals the length of the mask generation vector.

Embodiment 13 is an execution unit according to any one of the embodiments 1 to 12, wherein the execution unit is configured to process the data for the purposes of carrying out a cryptographic operation.

Embodiment 14 is an execution unit according to any one of embodiments 1 to 13, wherein the data represent a signature, a cryptographic key, data to be encrypted and/or data to be decrypted.

Embodiment 15 is an execution unit according to any one of embodiments 1 to 14, wherein the mask generation vector is a randomly generated vector.

Embodiment 16 is an execution unit according to any one of embodiments 1 to 15, wherein the plurality of cyclic codes are different.

Embodiment 17 is a method for calculating with masked data as described with reference to FIG. 6.

Embodiment 18 is a method according to embodiment 17, including the processing of the masked data by means of an accumulation register.

Embodiment 19 is a method according to embodiment 17 or 18, wherein the data include a first operand and a second operand and the first and the second operand are rotated, added or both.

Embodiment 20 is a method according to any one of embodiments 17 to 19, wherein the data include a first operand and a second operand and the first operand and the second operand are multiplied.

Embodiment 21 is a method according to embodiment 20, including carrying out a masked AND operation on the first operand and the second operand for the purposes of realizing the multiplication.

Embodiment 22 is a method according to embodiment 21, including refreshing the masking of the data to be processed during the masked AND operation.

Embodiment 23 is a method according to any one of embodiments 20 to 22, wherein the multiplication is a multiplication over a finite field $GF(2^n)$.

Embodiment 24 is a method according to any one of embodiments 17 to 23, wherein each block of codewords consists of the codewords of one of the cyclic codes.

Embodiment 25 is a method according to any one of embodiments 17 to 24, including correcting errors arising from the inhomogeneity between the blocks of codewords.

Embodiment 26 is a method according to embodiment 25, including correcting errors arising from the transition positions between the blocks of codewords.

Embodiment 27 is a method according to embodiment 25 or 26, including correcting the lack of a homomorphism of the masking in respect of the shift of data that arises from the transition positions between the blocks of codewords.

Embodiment 28 is a method according to any one of embodiments 17 to 27, wherein all codes have the same codeword length and the codeword length equals the length of the mask generation vector.

Embodiment 29 is a method according to any one of the embodiments 17 to 28, wherein the data are processed for the purposes of carrying out a cryptographic operation.

Embodiment 30 is a method according to any one of embodiments 17 to 29, wherein the data represent a signature, a cryptographic key, data to be encrypted and/or data to be decrypted.

Embodiment 31 is a method according to any one of embodiments 17 to 30, wherein the mask generation vector is a randomly generated vector.

Embodiment 32 is a method according to any one of embodiments 17 to 31, wherein the plurality of cyclic codes are different.

According to a further embodiment, an execution unit is provided, said execution unit including: means for producing a mask by multiplying a (e.g., randomly generated) mask generation vector by blocks of codewords of a plurality of cyclic codes, means for masking data to be processed by means of the mask, and means for processing the masked data by means of additions and rotations.

Even though the invention was predominantly shown and described with reference to certain embodiments, people who are acquainted with the specialist subject should understand that numerous modifications can be undertaken in respect of configuration and details thereof, without departing from the spirit and scope of the invention as defined by the following claims. The scope of the invention is therefore determined by the attached claims and the intention is that it should include all modifications that fall under the meaning or the scope of equivalence of the claims.

LIST OF REFERENCE SIGNS

| | |
|---|---|
| 100 | Processing device |
| 101 | CPU |
| 102 | RAM |
| 103 | Non-volatile memory |
| 104 | Crypto module |
| 105 | Bus |
| 106 | Analog module |
| 107 | Input/output interface |
| 108-111 | Crypto cores |
| 112 | Hardware random number generator |
| 200 | ALU |
| 201 | Accumulator |
| 202 | Register bank |
| 203, 204 | Operand register |
| 205 | Control logic |
| 206 | Further register |
| 300 | Masked ALU |
| 301 | Accumulator |
| 303, 304 | Operand register |
| 305-307 | Mask register |
| 308 | Masked AND |
| 309 | Masked AND |
| 310 | XOR |
| 311 | XOR |
| 312 | Correction circuit |

| | |
|---|---|
| 313-316 | XORs |
| 400 | Gate |
| 401, 402 | AND |
| 403, 404 | XOR |
| 500 | Execution unit |
| 501 | Mask generation circuit |
| 502 | Masking circuit |
| 503 | ALU |
| 600 | Flowchart |
| 601-603 | Processing steps |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An execution unit, comprising:
a mask generation circuit configured to generate a mask by multiplying a mask generation vector by blocks of codewords of a plurality of cyclic codes,
a masking circuit configured to generate, using the mask, masked shares of data to be processed, and
an arithmetic logic unit configured to process the masked data by means of additions and rotations;
wherein the data comprise a first operand and a second operand and the arithmetic logic unit is configured to multiply the first operand and the second operand;
wherein the execution unit further comprises a masked selection circuit which, for the purposes of realizing the multiplication, carries out a masked AND operation on the first operand or the second operand;
wherein the masked selection circuit is configured to refresh the masking of the data to be processed during the masked AND operation.

2. The execution unit of claim 1,
wherein the arithmetic logic unit comprises an accumulation shift register for processing the masked data.

3. The execution unit of claim 1,
wherein the data comprise a first operand and a second operand and the arithmetic logic unit is configured to rotate the first and the second operand, to add the first and the second operand, or both.

4. The execution unit of claim 1,
wherein the multiplication is a multiplication over a finite field $GF(2^n)$.

5. The execution unit of claim 1,
wherein each block of codewords consists of the codewords of one of a plurality of non-systematic cyclic codes.

6. The execution unit of claim 1, further comprising:
a correction circuit configured to correct errors arising from the inhomogeneity between the blocks of codewords.

7. The execution unit of claim 6,
wherein the correction circuit is configured to correct the errors arising from the transition positions between the blocks of codewords.

8. The execution unit of claim 6,
wherein the correction circuit is configured to correct the lack of homomorphism of the masking in respect of the shift of data that arises from the transition positions between the blocks of codewords.

9. The execution unit of claim 1,
wherein all codes have the same codeword length and the codeword length equals the length of the mask generation vector.

10. The execution unit of claim 1,
wherein the execution unit is configured to process the data for the purposes of carrying out a cryptographic operation.

11. The execution unit of claim 1,
wherein the data represent at least one of a signature, a cryptographic key, data to be encrypted or data to be decrypted.

12. The execution unit of claim 1,
wherein the mask generation vector is a randomly generated vector.

13. The execution unit of claim 1,
wherein the plurality of cyclic codes are different.

14. A method for calculating with masked data, the method comprising:
generating a mask by multiplying a mask generation vector by blocks of codewords of a plurality of cyclic codes,
generating, using the mask, masked share of data to be processed, and
processing the masked data by means of additions and rotations;
wherein the data comprise a first operand and a second operand;
further comprising multiplying the first operand and the second operand;
carrying out a masked AND operation on the first operand or the second operand the purposes of realizing the multiplication; and
refreshing the masking of the data to be processed during the masked AND operation.

* * * * *